United States Patent [19]

Beckwith, Jr.

[11] Patent Number: 4,492,036
[45] Date of Patent: Jan. 8, 1985

[54] MAGNETIC BALL BAR GAUGE

[75] Inventor: Walter L. Beckwith, Jr., Warwick, R.I.

[73] Assignee: Brown & Sharp Manufacturing Company, North Kingstown, R.I.

[21] Appl. No.: 569,997

[22] Filed: Jan. 11, 1984

[51] Int. Cl.³ .............................................. G01B 5/25
[52] U.S. Cl. ............................... 33/180 R; 33/181 R; 33/DIG. 1
[58] Field of Search ............ 33/180 R, 181 R, 169 C, 33/172 D, DIG. 1, 1 M, 1 H, 174 L, 185 R; 269/8

[56] References Cited

U.S. PATENT DOCUMENTS

| | | | |
|---|---|---|---|
| 3,428,305 | 2/1969 | Bohn | 269/8 |
| 3,723,928 | 3/1973 | Blakey et al. | 33/DIG. 1 |
| 4,141,150 | 2/1979 | Miller | 33/174 L |
| 4,150,490 | 4/1979 | Sluka | 33/1 H |
| 4,303,054 | 12/1981 | Lore | 33/DIG. 1 |
| 4,437,151 | 3/1984 | Hurt et al. | 33/174 L |

Primary Examiner—Willis Little
Attorney, Agent, or Firm—Wolf, Greenfield & Sacks

[57] ABSTRACT

A ball bar gauge for evaluating the performance of coordinate measuring machines is disclosed. The gauge consists of a rigid bar having a magnetic chuck at each end. Each magnetic chuck consists of a permanent magnet and six magnetic pole pieces surrounded by a non-magnetic housing. The bar is used with two precision tooling balls which are placed in the chucks at each end of the rod. In each chuck three of the pole pieces are slightly longer than the other three pole pieces to provide a stable three-point contact seat for the associated ball.

12 Claims, 2 Drawing Figures

MAGNETIC BALL BAR GAUGE

FIELD OF THE INVENTION

This invention relates to mechanical gauges for evaluating the performance of coordinate measuring machines.

BACKGROUND OF THE INVENTION

In order to be useful, a coordinate measuring machine must be able to reliably make precision measurements with an accuracy within specfication set by the manufacturer of the machine. Consequently, it is necessary to be able to evaluate the performance of the machine for two reasons. When the machine is initially purchased the purchaser may want to verify that the machine is indeed performing within the quoted specifications before he agrees to accept it. In addition, after the machine has been purchased, in order to ensure that it is operating properly, it is necessary to make periodic performance measurements to ensure that the machine is operating within acceptable tolerances.

There are various ways to perform tests which can evaluate the accuracy of a coordinate measuring machine. However, one set of standard tests has been developed by the American Society of Mechanical Engineers (ASME) for evaluating the performance of coordinate measuring machines. These tests are well-known in the art and are described in detail in a proposed ASME standard, No. B89.1.12, issued on Oct. 1, 1983.

The ASME standard prescribes various test procedures, for testing performance criteria such as repeatability, linear displacement accuracy and volumetric accuracy. The method specified in the ASME standard for checking volumetric accuracy limits uses a ball bar gauge.

As is well-known in the art, a ball bar gauge is a rigid bar with a precision diameter tooling ball affixed to each end. The ball bar is used with two sockets which are mounted on the machine to be tested. In accordance with well-known measurement technique, these sockets each contain magnetic chucks which attract and hold one of the tooling balls on the end of the ball bar gauge. To test a coordinate measuring machine with the ball bar gauge, one magnetic socket is mounted on the workpiece supporting surface and the other socket is mounted on the mechanism which normally holds the measuring probe. One of the balls at each end of the ball bar is placed in one of the sockets. Ihe machine and ball bar is moved to various angular positions specified in the ASME standard and the machine read-outs observed. The variation in the readings indicates the working tolerance for the machine.

In order to achieve a proper measurement with the above method, it is necesssary to utilize a ball bar gauge with balls that are spherical within very close tolerances. Tooling balls with the required tolerances are readily available commercially, but it has been a problem in the prior art to attach the commercial balls to the gauge bar while maintaining the necessary tolerances.

Several prior art methods have been utilized to provide this attachment. In one method a tapped hole is drilled in the ball for receiving a threaded stud which can then be screwed into a tapped hole in the bar. However, the drilling and tapping operations generally distort the ball so that the required tolerances cannot be achieved.

Another prior art attachment scheme has been to cement the balls to the ends of the bar with a suitable epoxy cement. However, a gauge with such attachments is fragile and susceptible to damage by dropping. Furthermore the balls cannot be easily replaced when damaged and thus the entire bar must be discarded if either ball is damaged.

In yet another prior art arrangement the tooling balls are machined with integral studs or projections which can then be fastened to the rigid bar by means of set screws. One problem with this arrangement is that machine balls with such integral studs cannot meet the tolerances which is typically available for balls which are completely spherical.

It is therefore an object of the present invention to provide a ball bar gauge in which the tooling balls can be spherical tooling balls which are commerically available.

It is another object of the present invention to provide a ball bar gauge which is physically rugged and not subject to damage from impacts.

It is yet another object of the present invention to provide a ball bar gauge in which the balls can be easily removed for replacement.

It is yet a further object of the present invention to provide a ball bar gauge which has a simple construction which can be readily assembled using simple parts.

SUMMARY OF THE INVENTION

A ball bar gauge is provided in which the tooling balls at each end of the tooling bar are attached to the rigid bar by means of magnetic sockets. Each socket consists of a permanent magnet and six pole pieces. Three of the pole pieces are slightly longer than the others to produce a stable three-point ball contact area. The magnet pole pieces are spaced apart by a non-magnetic spacer and surrounded by a non-magnetic housing to produce a complete compact unit.

DETAILED DESCRIPTION OF THE PREFERRED EMBODIMENT

Figures 1, 2:
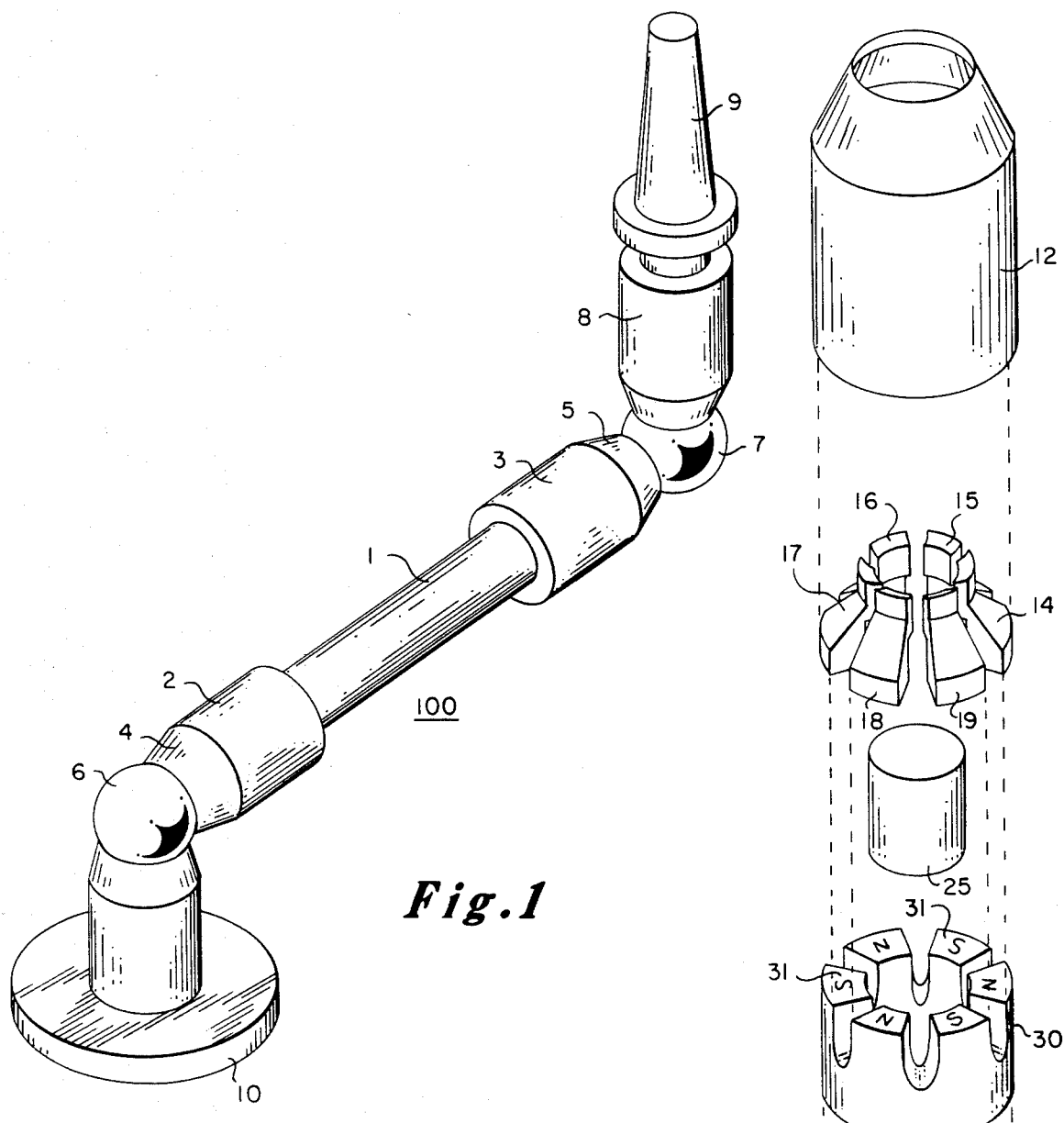
FIG. 1 of the drawing is a perspective view of the complete ball bar arrangement plus the fixed and free sockets.
FIG. 2 of the drawing is an exploded view of the magetic chuck at each end of the gauge bar.

FIG. 1 shows a complete ball bar gauge attached to its holding sockets. In use, fixed magnetic socket 10, which may be of conventional design, is mounted on the coordinate measuring machine workpiece supporting surface (not shown) and the tapered insert 9 of the free socket 8 is mounted in the measuring machine probe holder (not shown). Tooling balls 6 and 7 are then placed in the sockets 8 and 10. Balls 6 and 7 are conventional spherical tooling balls which have tolerances well below the tolerances intended to be measured. Ball bar gauge 100 is then placed on balls 6 and 7 where, in accordance with the invention, it is held by magnetic attraction from the magnets in the chucks 2 and 3.

The inventive ball bar gauge consists of a rod 1 which is rigidly attached to two magnetic chucks 2 and 3. Each of chucks 2 and 3 have tapered ends 4 and 5, respectively which provide clearance between the chucks 2 and 3 and the sockets 8 and 10 when the bar is moved into different positions in accordance with the standard measuring procedure. As will be described in detail below, chucks 2 and 3 contain a magnet and a plurality of pole pieces which provide a firm seat for the tooling balls. Although a fixed-length rod 1 is shown in FIG. 1, the ball bar gauge may be extended to any length by unscrewing one of chucks 2 or 3 and inserting one or more threaded extension pieces to extend the bar to any desired length.

FIG. 2 shows an exploded diagram of one of the magnetic chucks. Each chuck consists of a baseplate 35 which may be illustratively made out of steel approximately ⅜ of an inch thick. The baseplate may contain a threaded hole 36 for attachment to a threaded stud on the bar. Alternatively, a stud may be threaded into the baseplate for insertion into a tapped hole in the rigid bar. An illustrative size is approximately 1 and ⅜ inches in diameter. Located on the baseplate is a permanent magnet 30 with six alternating pole faces 31. Such a magnet is commerically available from a number of sources. On each of the six pole faces 31 is located one of chuck pole pieces 14–19. Each pole piece is comprised of magnetic steel and has a slanted face at approximately 45 degrees. In order to provide a firm seating of the tooling balls against the magnetic chucks, three of the pole pieces are slightly longer than the other three so that a three-point seating area is formed. For example, pole pieces 14, 16 and 18 may be a few thousands of an inch longer than pole pieces 15, 17 and 19. The pole pieces are separated by a spacer 25 which may illustratively be made out of a non-magnetic material such as brass or aluminum. The size of the spacer is approximately one half inch in diameter. The entire magnetic chuck is housed in a housing 12 made out of a non-magnetic material such as brass. In order to ensure sufficient clearance when the ball bar is swung into various positions, the housing 12 has a tapered top which is tapered at approximately 45 degrees. An illustrative size is 1⅜ inches in length by 1½ inches in diameter.

What is claimed is:

1. A ball bar gauge comprising,
   a rigid bar,
   a pair of tooling balls,
   a magnetic chuck attached to each end of said bar, each of said chucks engaging one of said tooling balls, each of said chucks comprising;
      a permanent magnet having a plurality of pole faces;
      means for attaching said magnet to said bar; and
      means for rigidly holding said tooling ball proximate to said magnet so that said ball will be attracted and removably held by said magnet.

2. A ball bar gauge according to claim 1 wherein said holding means comprises a plurality of pole pieces, each of said pole pieces being located adjacent to one of said pole faces.

3. A ball bar gauge according to claim 2 further comprising a non-magnetic spacer separating said pole pieces.

4. A ball bar gauge according to claim 3 wherein said attaching means comprises a baseplate and a non-magnetic housing enclosing said magnet and said pole pieces, said housing being attached to said baseplate.

5. A ball bar gauge according to claim 4 wherein the end of said housing opposite to said end attached to said baseplate is tapered.

6. A ball bar gauge according to claim 5 wherein said chuck comprises at least three pole pieces.

7. A ball bar gauge according to claim 6 wherein said chuck comprises at least six pole pieces, three of said pole pieces being longer than the other pole pieces so that the tooling ball will contact said chuck at three spots.

8. A ball bar gauge comprising,
   a rigid bar,
   a magnetic chuck attached to each end of said bar for engaging a tooling ball, said chuck comprising;
      a baseplate for attachment to said bar;
      a permanent magnet having a plurality of alternating polarity pole faces;
      a plurality of pole pieces, each of said pole pieces being located adjacent to one of said pole faces;
      a cylindrical spacer located between said pole pieces; and
      a non-magnetic housing enclosing said magnet and said pole pieces, said housing being attached to said baseplate.

9. A ball bar gauge according to claim 8 wherein said chuck comprises at least three pole pieces.

10. A ball bar gauge according to claim 9 wherein said chuck comprises at least six pole pieces, three of said pole pieces being longer than the other pole pieces so that the tooling ball will contact said chuck at three spots.

11. A ball bar gauge according to claim 10 wherein the end of said housing opposite to said end attached to said baseplate is tapered.

12. A ball bar gauge comprising,
   a rigid bar of cylindrical cross-section,
   a magnetic chuck attached to each end of said bar for engaging a tooling ball, said chuck comprising;
      a disk-shaped baseplate having a tapped hole in the center thereof for accepting a threaded member to attach said baseplate to said bar;
      a permanent magnet having six alternating polarity pole faces located in a cylindrical arrangement;
      six pole pieces, each of said pole pieces being fabricated of magnetic material and being located adjacent to one of said pole faces, three of said pole pieces being longer than the other three pole pieces, said longer pieces alternating with said other pieces to provide a three-point contact for said tooling ball;
      a cylindrical non-magnetic spacer located in the center of said pole pieces; and
      a non-magnetic housing having a generally tubular shape with one end tapering to a diameter less than the maximum diameter, said housing enclosing said magnet and said pole pieces and being attached to said baseplate.

* * * * *